US010546027B1

(12) United States Patent
Parent et al.

(10) Patent No.: US 10,546,027 B1
(45) Date of Patent: Jan. 28, 2020

(54) DATA SEARCH QUERIES FOR DESCRIPTIVE SEMANTICS EXTRACTED FROM ITEM REVIEWS

(71) Applicant: Amazon Technologies, Inc., Seattle, WA (US)

(72) Inventors: Gabriel Parent, Emeryville, CA (US); Debprakash Patnaik, Bellevue, WA (US); Amanda Dee Bottorff, Seattle, WA (US); Matthew McDonald Furlong, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 632 days.

(21) Appl. No.: 14/734,701

(22) Filed: Jun. 9, 2015

(51) Int. Cl.
*G06F 16/9535* (2019.01)
*G06F 16/2457* (2019.01)
*G06F 16/9032* (2019.01)

(52) U.S. Cl.
CPC .... *G06F 16/9535* (2019.01); *G06F 16/24578* (2019.01); *G06F 16/90324* (2019.01)

(58) Field of Classification Search
None
See application file for complete search history.

(56) References Cited

U.S. PATENT DOCUMENTS

| 8,554,701 | B1* | 10/2013 | Dillard | G06N 99/005 |
| | | | | 706/12 |
| 8,631,029 | B1* | 1/2014 | Amacker | G06F 3/0482 |
| | | | | 707/766 |
| 2008/0215571 | A1* | 9/2008 | Huang | G06F 17/30719 |
| 2015/0161271 | A1* | 6/2015 | Gur | G06F 17/3087 |
| | | | | 707/728 |

\* cited by examiner

*Primary Examiner* — Alex Gofman
*Assistant Examiner* — Umar Mian
(74) *Attorney, Agent, or Firm* — Thomas | Horstemeyer, LLP

(57) ABSTRACT

Disclosed are various embodiments for performing data search queries for descriptive semantics extracted from item reviews. Search queries that resulted in a selection of a browse node of an item taxonomy are identified and various items associated with the browse node are determined. Customer reviews for the various items are used to phrases used in the customer reviews that also appear in the search queries. The phrases may be ranked based at least in part on a polarity metric that describes a subjectivity, sentiment, and/or coverage of the phrase. Phrases with a rank exceeding a predefined threshold may be made available for use by a search component of a network site.

20 Claims, 9 Drawing Sheets

DATA SEARCH QUERIES FOR DESCRIPTIVE SEMANTICS EXTRACTED FROM ITEM REVIEWS

BACKGROUND

When searching for items to purchase, download, or otherwise consume, a user of an electronic commerce application may perform a search for an item using a search engine or other search component. As search results frequently list hundreds to thousands of potential items, the user may be required to refine the search results based on price, categories, brand, or customer review metrics (e.g., one star to five stars).

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure relates to performing data search queries for descriptive semantics extracted from item reviews. As noted above, when searching for items to purchase, download, or otherwise consume, a user of an electronic commerce application may perform a search for an item using a search engine or other search component. For example, a user may perform a search for "flat screen television" or "laptop computer." As search results for these broad types of searches can list hundreds to thousands of potential items, the user may be required to refine the search results based on price, categories, brand, customer review metrics (e.g., one star to five stars), or other factors.

The customer review metrics used to filter search results may not be indicative of customer sentiment expressed in the reviews. In addition, the customer review metrics are usually used to refine search results at the end of a search. For example, if the user is searching for a television, then the user may drill down to three or four potential televisions, and use the customer review metrics to identify one of the four televisions to purchase.

According to various embodiments, customer reviews for products or items offered through an electronic commerce application may be used to increase search accuracy and relevancy. Search queries performed by users of the electronic commerce application are examined to determine whether various phrases used in the search queries also appear in customer reviews. Phrases that are helpful in locating products may be used to suggest search parameters to users or may be used to navigate to browse nodes in an item taxonomy. Phrases that are ideal for suggestions may include phrases that are subjective in nature and have positive consumer sentiment.

The present disclosure solves a technological problem in an environment of electronic commerce by using customer review data, as well as customer sentiment and customer review semantics extracted using artificial intelligence techniques, to increase search accuracy and relevancy. In the following discussion, a general description of the system and its components is provided, followed by a discussion of the operation of the same.

Figure 1A:
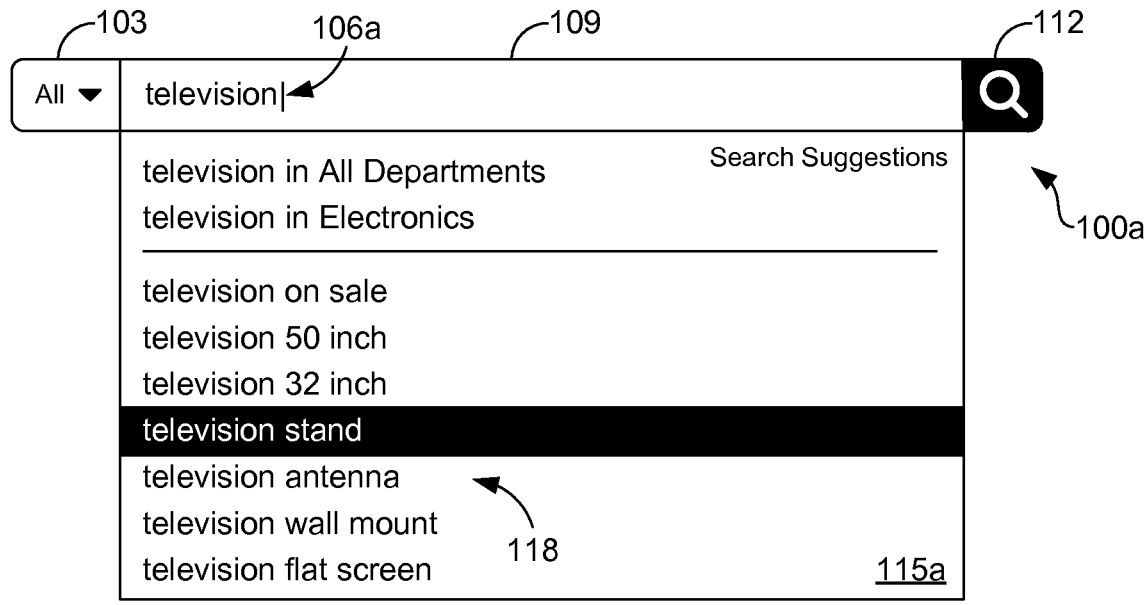
FIGS. 1A-1B are drawings of a search component according to various embodiments of the present disclosure.

With reference to FIG. 1A, shown is a search component 100a of an electronic commerce application or similar system which may be used to perform searches for various items, such as items capable of being purchased, leased, downloaded, or otherwise consumed by way of the electronic commerce application. For example, a user may select an item category 103 (e.g., "All," "Appliances," "Electronics," "Music," "Toys and Games," or other category) and provide a search query 106a (e.g., "television") to locate items associated with the item category 103. The search query 106a may be provided in a text area 109 using a suitable input device, such as a keyboard, a mouse, or a touch-screen display. By selecting or otherwise manipulating a submit component 112, a search may be performed using the search query 106a provided in the text area 109.

In various embodiments, the search component 100a may comprise a search engine auto-complete component 115a. The search engine auto-complete component 115a includes a dropdown menu or other similar user interface component that shows suggested searches 118 to the user. As may be appreciated, suggested searches 118 may include searches performed frequently by users of an electronic commerce application or similar system. However, when a suggested search is used, search results may only provide items having those terms appear in a description of those items. For example, a search for "television stand" will only result in items having "television stand" in a title or a description of the item.

Figure 1B:

Referring next to FIG. 1B, shown is another search component 100b of an electronic commerce application or similar system which may be used to perform searches for items. In some situations, a user may desire to enter a subjective search term or phrase to locate items. For example, a user may desire to search for televisions that are suitable for a particular use, such as watching sports, playing video games, etc. However, search engines may only be able to locate items having those subjective uses appearing verbatim in a free-text description of the item. For example, a search query 106b of "television good for use outdoors"

may only return items where a manufacturer or seller-provided description of the item includes "good for use outdoors."

According to various embodiments, customer reviews provided by users of an electronic commerce application may be leveraged to improve search accuracy and search relevancy. For example, subjective phrases appearing in various customer reviews may be identified and surfaced for use by the search component 100b (e.g., a search engine), the search engine auto-complete component 115b, or other search components 100. However, determining ideal phrases for use by the search components 100 remains problematic as some customer reviews may be negative or may provide irrelevant information.

Figure 2:
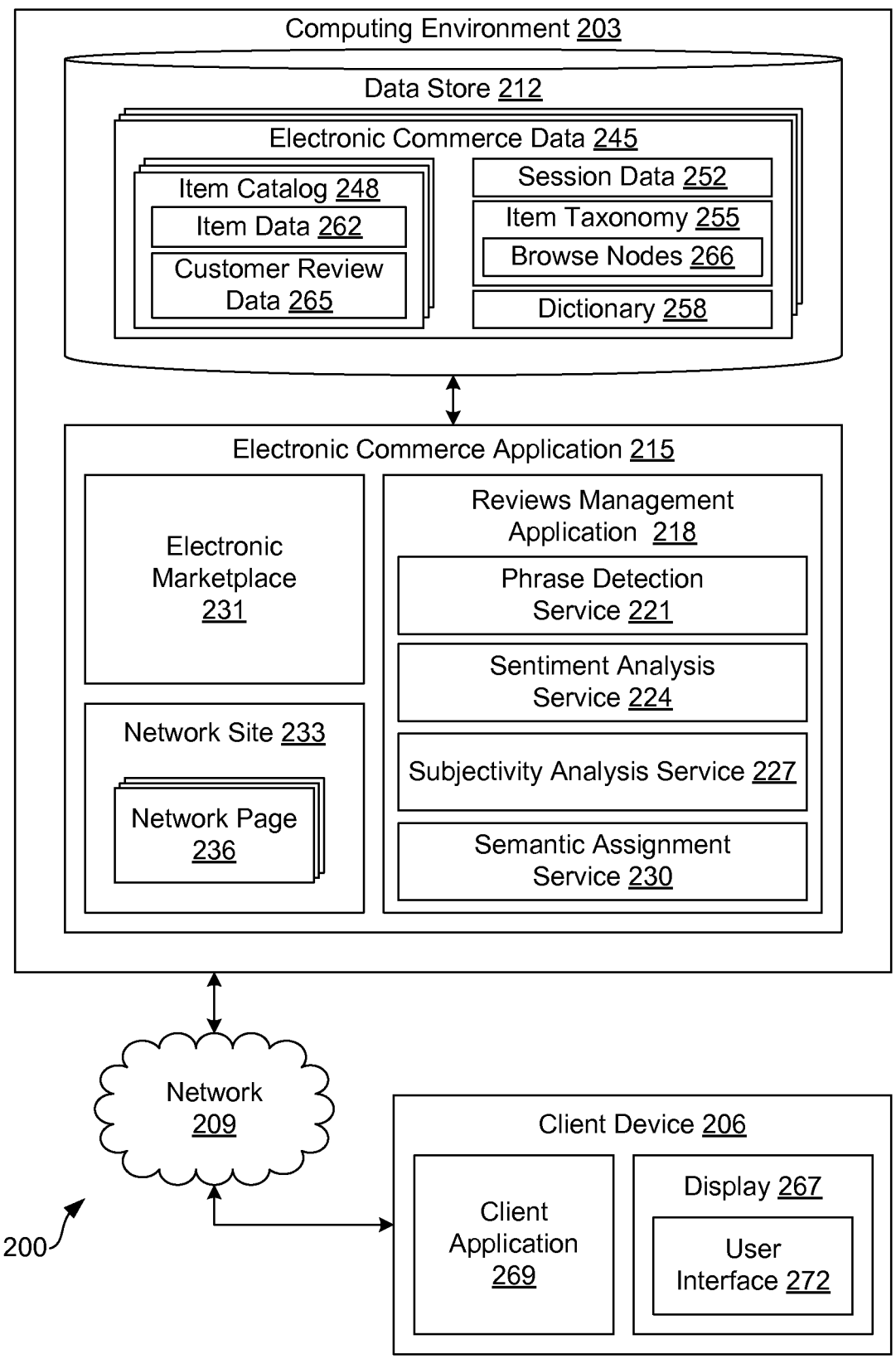
FIG. 2 is a drawing of a networked environment according to various embodiments of the present disclosure.

With reference to FIG. 2, next a discussion of a networked environment 200 is provided according to various embodiments followed by a discussion of the operation of the same. The networked environment 200 includes a computing environment 203 and a client device 206, which are in data communication with each other via a network 209. The network 209 includes, for example, the Internet, intranets, extranets, wide area networks (WANs), local area networks (LANs), wired networks, wireless networks, or other suitable networks, etc., or any combination of two or more such networks. For example, such networks may comprise satellite networks, cable networks, Ethernet networks, and other types of networks.

The computing environment 203 may comprise, for example, a server computer or any other system providing computing capability. Alternatively, the computing environment 203 may employ a plurality of computing devices that may be arranged, for example, in one or more server banks or computer banks or other arrangements. Such computing devices may be located in a single installation or may be distributed among many different geographical locations. For example, the computing environment 203 may include a plurality of computing devices that together may comprise a hosted computing resource, a grid computing resource and/or any other distributed computing arrangement. In some cases, the computing environment 203 may correspond to an elastic computing resource where the allotted capacity of processing, network, storage, or other computing-related resources may vary over time.

Various applications and/or other functionality may be executed in the computing environment 203 according to various embodiments. Also, various data is stored in a data store 212 that is accessible to the computing environment 203. The data store 212 may be representative of a plurality of data stores 212 as may be appreciated. The data stored in the data store 212, for example, is associated with the operation of the various applications and/or functional entities described below.

The components executed on the computing environment 203, for example, include an electronic commerce application 215, a reviews management application 218, a phrase detection service 221, a sentiment analysis service 224, a subjectivity analysis service 227, a semantic assignment service 230, and other applications, services, processes, systems, engines, or functionality not discussed in detail herein.

The electronic commerce application 215 is executed to facilitate the online purchase of items over the network 209 through an electronic marketplace 231. The electronic marketplace 231 includes a network site 233 associated with the electronic commerce application 215 where users can purchase, lease, rent download, or otherwise consume various items over the network 209. The electronic commerce application 215 also performs various backend functions associated with the online presence of a merchant in order to facilitate the online purchase of items. For example, the electronic commerce application 215 generates network pages 236 such as web pages or other types of network content that are provided to client devices 206 for the purposes of selecting items for purchase, rental, download, lease, or other form of consumption as will be described.

The reviews management application 218 is executed to identify phrases used in search queries 106 and customer reviews that, when surfaced, increase search accuracy and search relevancy. To this end, the reviews management application 218 may employ the phrase detection service 221 to detect phrases used in search queries 106 and customer reviews. As phrases ideal for increasing accuracy and relevancy may require positive sentiment, a high degree of subjectivity, and broad coverage (e.g., used frequently in search queries 106 and customer reviews), the reviews management application 218 may employ the sentiment analysis service 224 to determine a sentiment of a phrase and the subjectivity analysis service 227 to determine a subjectivity of a phrase. In various embodiments, the sentiment and/or the subjectivity may be defined using a metric, such as a numeric value.

The reviews management application 218 may employ a semantic assignment service 230 to determine a semantic structure of phrases identified by the phrase detection service 221. In some embodiments, the semantic assignment service 230 uses phrase chunking to identify a semantic structure of a phrase. Phrase chunking may include a natural language process that separates and segments a phrase into sub-constituents, such as a noun, a verb, an adverb, a preposition, prepositional phrases, etc. To this end, the semantic assignment service 230 may comprise a natural language processor or other similar component.

The data stored in the data store 212 includes, for example, electronic commerce data 245, and potentially other data. Electronic commerce data 245 includes, for example, an item catalog 248, session data 252, data for an item taxonomy 255, dictionary data 258, and potentially other data.

The item catalog 248 may include various data regarding items in a catalog. Such items may correspond to products, goods, services, downloads, and so on, which may be offered for order by users by way of the electronic commerce application 215. The item catalog 248 may include item data 262 regarding each item in the item catalog 248 that may include a name, description, price, genre, subgenre, categories, images, videos, tax categories, options, shipping categories, customer review data 265, and so on. In some cases, the items may correspond to other items that may be reviewed such as, for example, restaurants, merchants, housing, service providers, and/or other potential objects of review that may not be available for ordering through the electronic commerce application 215.

The customer review data 265 may include data provided by one or more users for an item in the item catalog 248. For example, a user who purchased an item by way of the electronic commerce application 215 may provide a free-text description of their experience purchasing, using, or otherwise associating with an item being reviewed. The customer review data 265 may also include a customer review metric, such as a star or numeric rating provided by a user.

Session data 252 may include various data associated with electronic commerce sessions performed by users of the electronic commerce application 215. In various embodiments, such data includes navigation paths traversed by users as they search for and/or locate items to purchase or otherwise consume. The session data 252 may be utilized by the reviews management application 218 to identify search queries 106 performed by users that resulted in the users arriving at a particular browse node 266 in the item taxonomy 255 during an electronic commerce session. An electronic commerce session may include, for example, a predefined amount of time a user traverses various network pages 236 or other network content served up by the electronic commerce application 215.

The item taxonomy 255 includes a hierarchical arrangement of browse nodes 266 that may be used by users of the electronic commerce application 215 to navigate items in the item catalog 248. Navigation may be performed by selecting browse nodes 266 that describe a particular category of items (e.g., Electronics, Clothing, Home Goods, or other category). To this end, each browse node 266 may be associated with items in the item catalog 248. For example, a browse node 266 for "Electronics," may include electronic items, such as laptop computers, televisions, smartphones, video game consoles, etc.

The client device 206 is representative of a plurality of client devices that may be coupled to the network 209. The client device 206 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, or other devices with like capability. The client device 206 may include a display 267. The display 267 may comprise, for example, one or more devices such as liquid crystal display (LCD) displays, gas plasma-based flat panel displays, organic light emitting diode (OLED) displays, electrophoretic ink (E ink) displays, LCD projectors, or other types of display devices, etc.

The client device 206 may be configured to execute various applications such as a client application 269 and/or other applications. The client application 269 may be executed in a client device 206, for example, to access network content served up by the computing environment 203 and/or other servers, thereby rendering a user interface 272 on the display 267. To this end, the client application 269 may comprise, for example, a browser, a dedicated application, etc., and the user interface 272 may comprise a network page, an application screen, etc. The client device 206 may be configured to execute applications beyond the client application 269 such as, for example, email applications, social networking applications, word processors, spreadsheets, and/or other applications.

Next, a general description of the operation of the various components of the networked environment 200 is provided. To begin, the electronic commerce application 215 performs the collection and storage of customer review data 265 in the data store 212. As may be appreciated, customer reviews may be provided by users of the electronic commerce application 215 to review an item purchased or otherwise consumed by the user. In some embodiments, the electronic commerce application 215 verifies that a user has purchased or consumed an item for which the user is reviewing.

The reviews management application 218 may leverage the customer review data 265 to improve search accuracy and relevancy. For example, the reviews management application 218 may surface keywords or phrases used in customer reviews for use in a search component 100 (FIGS. 1A-1B) of the electronic commerce application 215, such as a search engine, a search engine auto-complete component 115 (FIGS. 1A-1B), or a search results refinement component. As users traditionally perform searches for items having beneficial qualities or features (as opposed to items having poor qualities), it is beneficial to identify phrases that have positive consumer sentiment.

For a browse node 266 in an item taxonomy, the reviews management application 218 may identify search queries 106 that were performed that resulted in a user navigating to the browse node 266. For example, a search query 106 of "video game console with great graphics" can be identified for a browse node 266 for "Video Game Consoles," if a user performed the search query 106 to arrive at the "Video Game Consoles" browse node 266 within an electronic commerce session.

The phrase detection service 221 may identify one or more phrases used in the search queries 106. Referring to the example above, the phrase "video game console with great graphics" may be identified from the example search query 106. Other example phrases that can be identified in search queries 106 can include "video game console that are easy to play," "video game console with excellent audio," and "video game console with state-of-the-art graphics."

A semantic assignment service 230 may determine a semantic structure of the phrases. In some embodiments, the semantic assignment service 230 may employ phrase chunking to identify a semantic structure of a phrase. Phrase chunking may include separating and segmenting a phrase into sub-constituents, such as a noun, a verb, an adverb, a preposition, prepositional phrases, etc. To this end, the semantic assignment service 230 may comprise a natural language processor or other similar component. In the example above, the phrase "video game console with great graphics" can be described as having a semantic structure of noun ("video game consoles"), preposition ("with"), adjective ("great"), and noun ("graphics"), or noun-preposition-adjective-noun. In some embodiments, only phrases matching a predefined semantic structure are used.

The semantic structure identified by the semantic assignment service 230 may be used to determine a sentiment metric and/or a subjectivity metric. The sentiment metric may comprise, for example, a numeric value that describes a customer sentiment of the phrase, whether positive, negative, or neutral. In various embodiments, a predefined list of keywords may be compared to adjectives identified in a phrase to determine whether customer sentiment is positive, negative, or neutral. In one example, the phrase "headsets with good reception" may be parsed by the sentiment analysis service 224 to identify that "good" is an adjective used traditionally in positive reviews and that "good" is being used to describe "reception." A sentiment metric may be generated that is indicative of a positive customer sentiment.

In another example, the phrase "headsets with bad reception" may be parsed by the sentiment analysis service 224 to identify that "bad" is an adjective used generally in negative reviews and that "bad" is being used to describe "reception." In this example, a sentiment metric may be generated that is indicative of a negative customer sentiment. In various embodiments, the sentiment metric may be a metric having a numeric value between −1 and 1, where values in the range of −1 to 0 are indicative of a negative sentiment and values in the range of 0 to 1 are indicative of a positive sentiment.

The subjectivity metric may comprise a numeric value that describes whether a word or phrase is subjective (as opposed to objective). In one example, a predefined list of terms may be compared to a word or series of words in a phrase to determine whether a phrase is subjective. In one example, the phrase "headphones that are comfortable" may be analyzed by the subjectivity analysis service 227 to determine that comfort is a subjective quality or an opinion of the user, potentially varying from other user opinions. In various embodiments, the subjectivity metric may be a metric having a numeric value between −1 and 1, where values in the range of −1 to 0 are indicative of a phrase being objective and values in the range of 0 to 1 are indicative of a phrase being subjective.

As it is beneficial to identify phrases that are widely used, a search count and a customer review count may be determined. A search count may comprise, for example, a number of times a phrase resulted in search results having items within the browse node 266. As a non-limiting example, a number of times the search query 106 of "television with good audio quality" was used to return search results having items in the "Televisions" browse node 266 may be determined.

The customer review count may comprise, for example, a number of times the phrase was used in customer reviews for items associated with the browse node 266. For example, a number of times the phrase "television with good audio quality," is used in customer reviews for items in the "Televisions" browse node 266 may be determined.

The reviews management application 218 may determine which phrases to surface for use by various search components 100 of the electronic commerce application 215. In various embodiments, the phrases may be ranked based at least in part on the sentiment metric, the subjectivity metric, the search count, the customer review count, and/or other factors. In one embodiment, a polarity metric may be determined as a function of the sentiment metric, the subjectivity metric, the search count, and the customer review count. In various embodiments, the function may be expressed as:

$$P_{Metric} = \text{Average}(\alpha + \beta) + \delta + \varepsilon \quad \text{(Eq. 1)},$$

where $P_{Metric}$ is the polarity metric, $\alpha$ is the sentiment metric, $\beta$ is the subjectivity metric, $\delta$ is the search count, and $\varepsilon$ is the customer review count.

As may be appreciated, the phrases in the list having a high ranking may be indicative of phrases that have positive sentiment, high subjectivity, and wide coverage (e.g., phrases used frequently in search queries 106 and customer reviews). The phrases having a rank exceeding a predefined threshold may be surfaced for use by search components 100 of the electronic commerce application 215. For example, the phrases in the top 10% of a ranking may be associated with the browse node 266 such that items associated with the browse node 266 may be queried using the phrases. For the phrases that do not exceed the predefined threshold, those phrases are not surfaced as they may have negative sentiment, low subjectivity, and/or low coverage.

Further, in some embodiments, the phrases to be surfaced may be used to match the phrases with customer reviews for items associated with a browse node 266. For example, assuming a phrase identified for a search query 106 includes "headphones with great audio quality," customer reviews may be analyzed to determine whether a similar or equivalent phrase is used. Analysis may include querying the data store 212 using, for example, a structure query language (SQL) query, to identify occurrences of the phrases in customer review data 265.

In various embodiments, the reviews management application 218 applies a filter to the phrases to remove customer reviews having terms not useful in performing searches for items, vulgar terms, or other terms. In one embodiment, a predefined list of words or phrases configurable by an administrator may be compared to the customer reviews to remove customer reviews using equivalent or similar words or phrases as set forth in the predefined list.

As a result, customer reviews that are identified that may have positive sentiment, high subjectivity, and broad coverage. As may be appreciated, these customer reviews may be beneficial in increasing search accuracy and/or search relevancy. Accordingly, items associated with the customer reviews using the phrases may be associated with those phrases for use in a search component 100 of the electronic commerce application 215 which may include, for example, a search engine, a search engine auto-complete component 115, or a search results refinement component.

As a non-limiting example, a customer review for the item "BetaCo Laptop Computer" may include the phrase "great battery life." As the phrase "great battery life" may be determined to have a positive sentiment, high subjectivity, and broad coverage this phrase may be surfaced for use in a search engine of the electronic commerce application 215. For example, when a user performs a query for "laptop great battery life," the "BetaCo Laptop Computer" may be shown in the search results, as well as a browse node 266 for "Laptops," "Electronics," and/or other applicable browse nodes 266.

Figure 3:
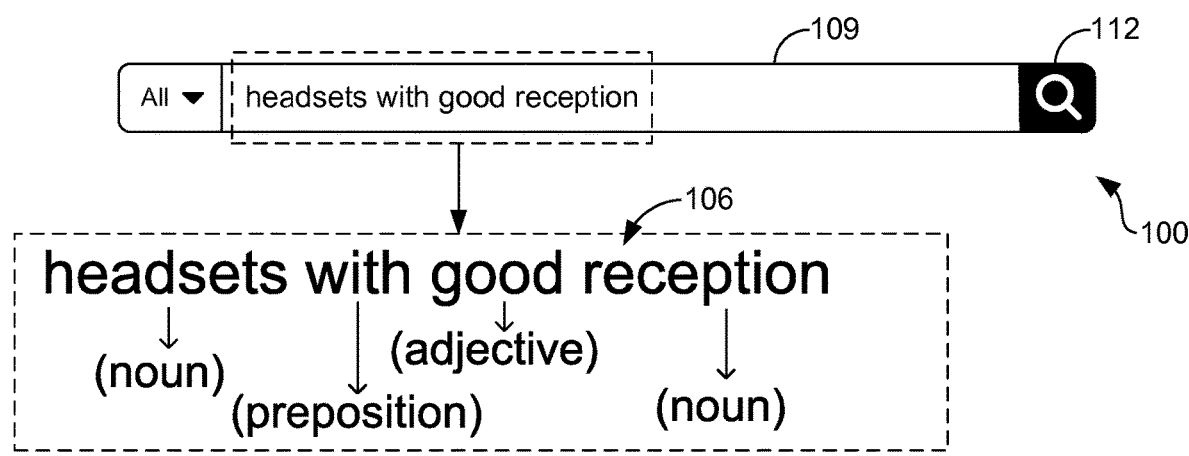
FIG. 3 is a drawing illustrating a semantic structure of a search query performed in the networked environment of FIG. 2 according to various embodiments of the present disclosure.

Referring next to FIG. 3, shown is a search component 100 of an electronic commerce application 215 (FIG. 2) or similar system that may be used to perform searches for various items, such as items capable of being purchased, leased, downloaded, or otherwise consumed by way of the electronic commerce application 215. The search query 106 may be provided in a text area 109 using a suitable input device, such as a keyboard, a mouse, or a touch-screen display. By selecting or otherwise manipulating a submit component 112, a search may be performed using the search query 106 provided in the text area 109.

In various embodiments, the semantic assignment service 230 (FIG. 2) may determine a semantic structure of a phrase (e.g., "headsets with good reception") in the search query 106. Identifying the semantic structure may include a natural language process that separates and segments a phrase into sub-constituents, such as a noun, a verb, an adverb, a preposition, prepositional phrases, etc. In the non-limiting example of FIG. 3, the phrase "headsets with good reception," identified from the search query 106, may be described as having a semantic structure of noun ("headsets"), preposition ("with"), adjective ("good"), and noun ("reception"), or noun-preposition-adjective-noun. The semantic structure may be used to determine a sentiment metric and/or a subjectivity metric, as will be discussed in greater detail below.

Figure 4A:
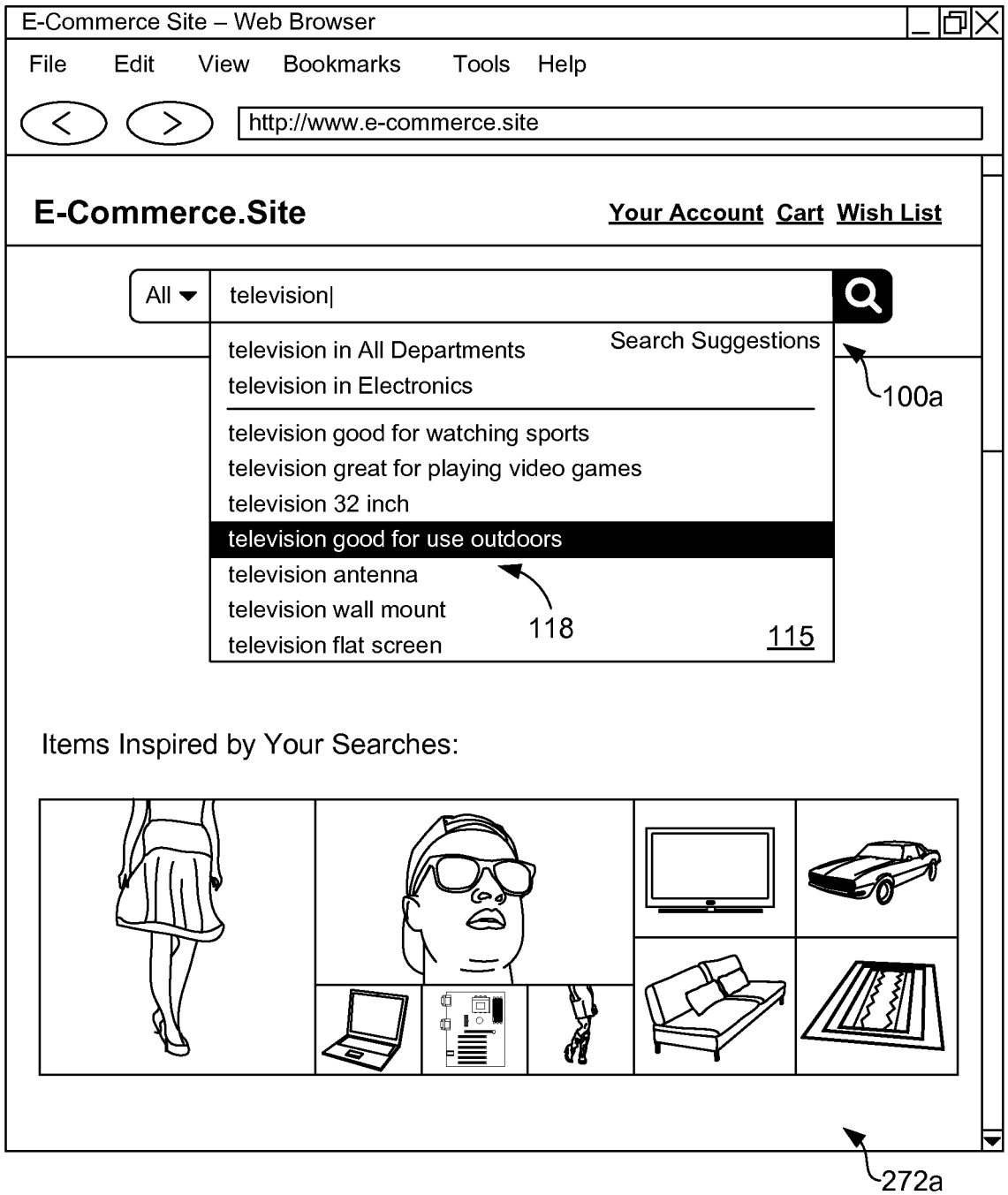
FIGS. 4A-4C are drawings of example user interfaces rendered by a client device in the networked environment of FIG. 2 according to various embodiments of the present disclosure.

Turning now to FIG. 4A, shown is an example of a user interface 272a comprising a search component 100a of an electronic commerce application 215 (FIG. 2) that may include suggested searches 118 in a search engine auto-complete component 115. In the non-limiting example of FIG. 4A, the suggested searches 118 include phrases extracted from search queries 106 and/or customer reviews. For example, the phrases "good for watching sports," "great for playing video games," and "good for use outdoors," may be phrases identified in customer reviews for items associated with a browse node 266 (FIG. 2) for "Televisions," "Electronics," and/or other applicable browse nodes 266. In various embodiments, the phrases used in the search component 100 are determined based on sentiment, subjectivity, and a number of times the phrase appears in search queries 106 or customer reviews.

Figure 4B:
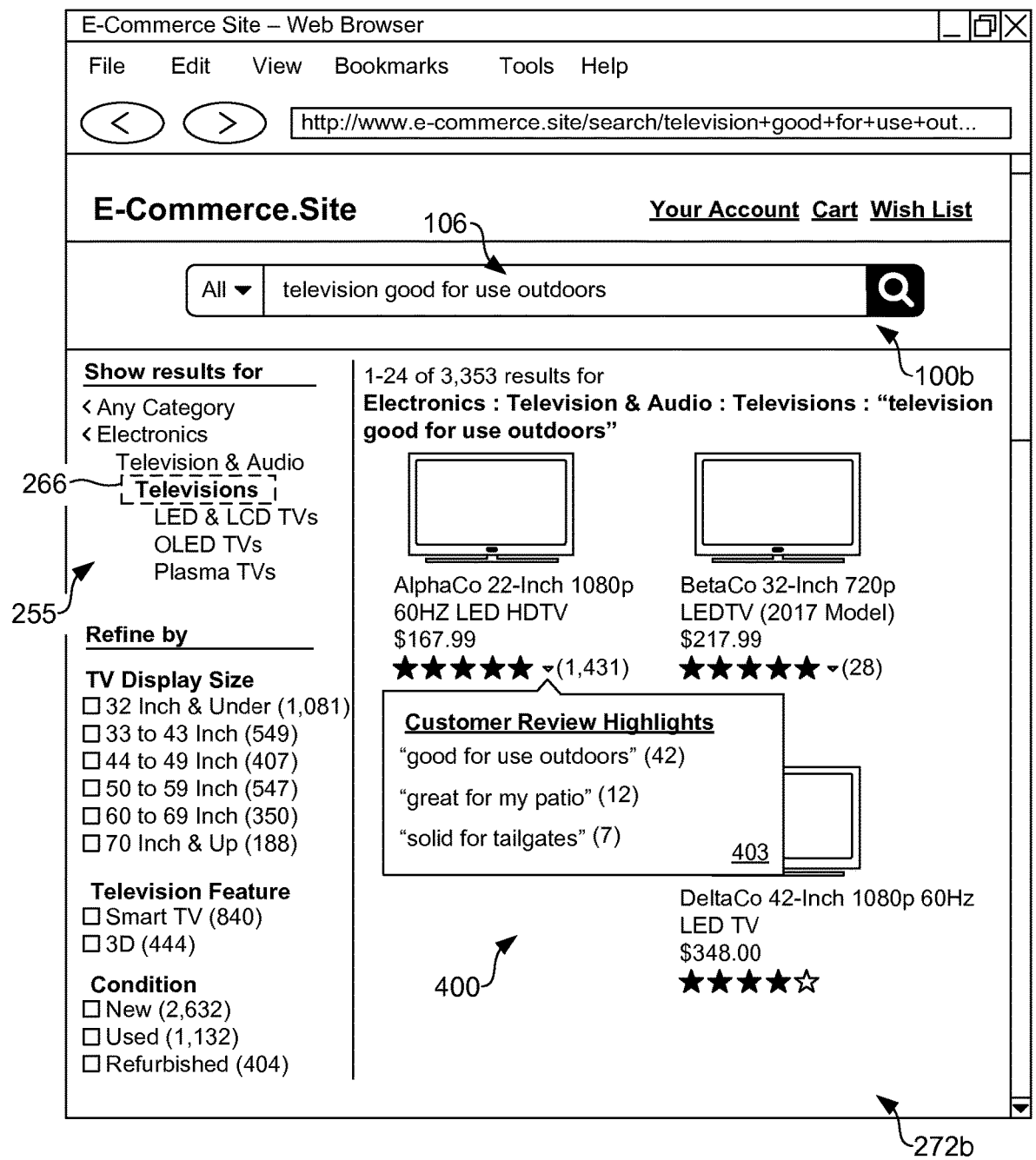

Moving on to FIG. 4B, when a search query 106 is submitted through the search component 100b, search results 400 may be provided in the user interface 272b. The search results 400 may include items having customer reviews that include a phrase used in the search query 106. For example, the phrase "good for use outdoors" may be used to identify items having customer reviews that include an equivalent or similar phrase.

The user interface 272b may comprise an item taxonomy 255 that includes various browse nodes 266 that, when manipulated, allow a user to further refine search parameters to reduce a number of items shown. For example, a current browse node 266 of FIG. 4B comprises the "Televisions" node. By selecting a browse node 266 for "LED & LCD TVs," the search results may be refined to show only items associated with that category.

In various embodiments, a user may manipulate a component for a search result to display a dialog 403 in the user interface 272b. The dialog 403 may include phrases surfaced for a browse node 266, such as phrases that have positive sentiment, high subjectivity, and used frequently in search queries 106 and/or customer reviews. As the phrases may be used frequently when performing searches for items in the browse node 266, they may be used to recommend the item to a user.

Figure 4C:
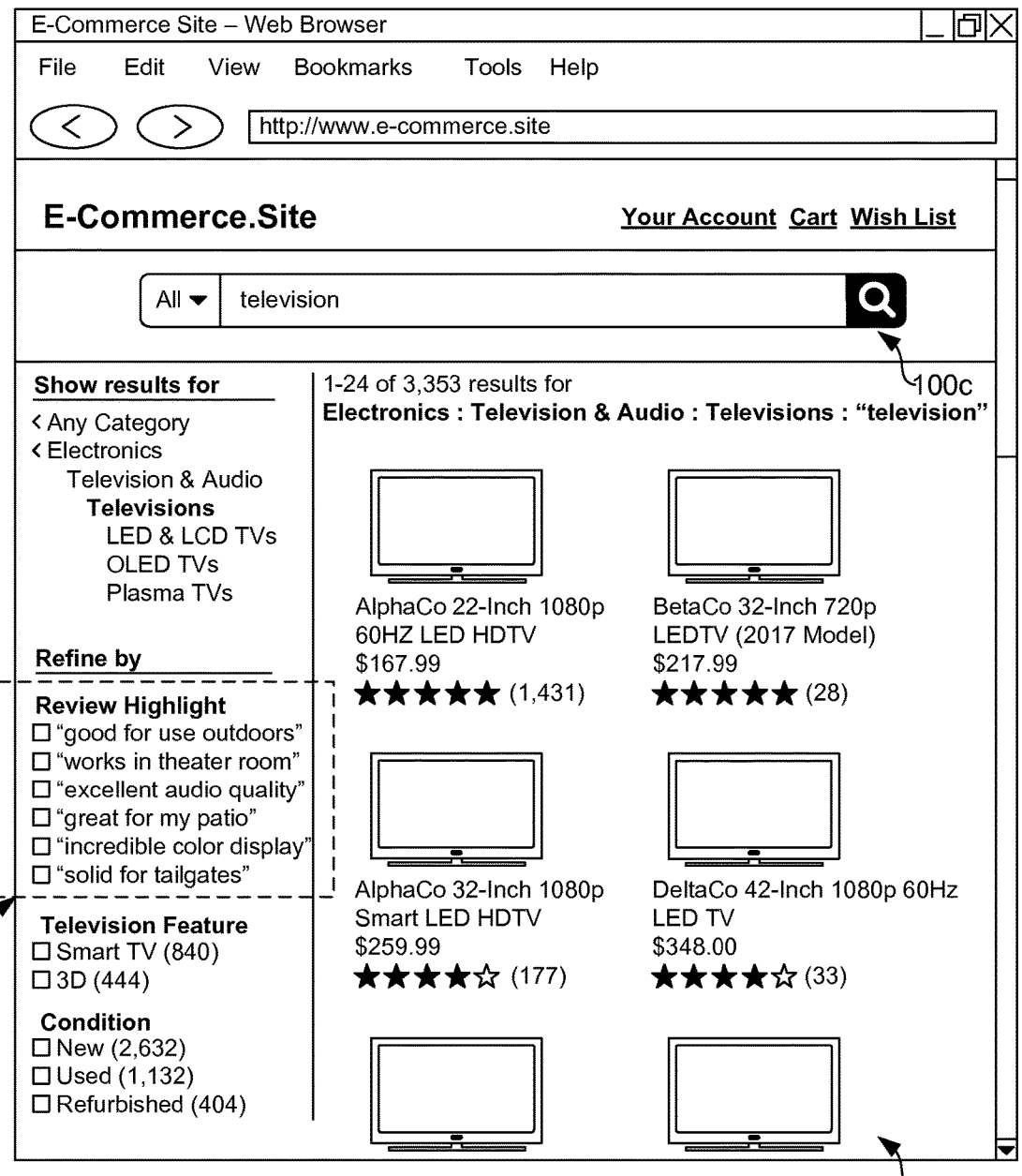

Moving on to FIG. 4C, shown is an example of a user interface 272c comprising search components 100c . . . 100d (collectively search components 100). For example, the first search component 100c may comprise a search engine and the second search component 100d may comprise a search results refinement component. In various embodiments, the search results refinement component includes phrases extracting from search queries 106 and matched with customer reviews. For example, the phrases "good for use outdoors," "works in a theater room," and so on, may be phrases used frequently for search queries 106 for items in the "Television" browse node 266. As may be appreciated, the phrases used in the search results refinement component may be determined based on sentiment, subjectivity, and a number of times the phrase appears in search queries 106 or customer reviews.

Figure 5:
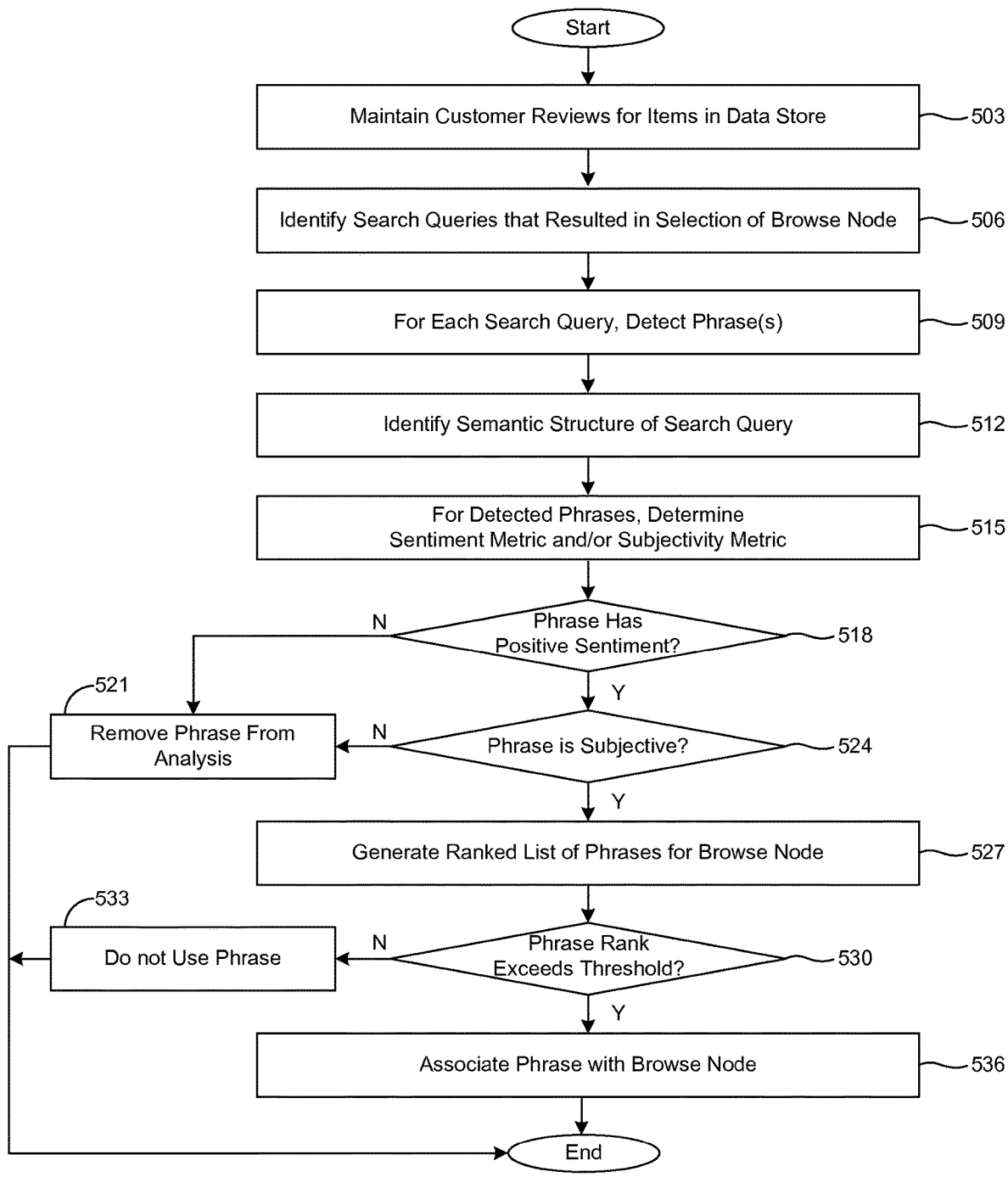
FIG. 5 is a flowchart illustrating one example of functionality implemented as portions of a reviews management application executed in a computing environment in the networked environment of FIG. 2 according to various embodiments of the present disclosure.

Referring next to FIG. 5, shown is a flowchart that provides one example of the operation of a portion of the reviews management application 218 according to various embodiments. It is understood that the flowchart of FIG. 5 provides merely an example of the many different types of functional arrangements that may be employed to implement the operation of the portion of the reviews management application 218 as described herein. As an alternative, the flowchart of FIG. 5 may be viewed as depicting an example of elements of a method implemented in the computing environment 203 (FIG. 2) according to one or more embodiments.

Beginning with 503, customer reviews are maintained for items in the data store 212 (FIG. 2). As may be appreciated, customer reviews may be provided by users of the electronic commerce application 215 (FIG. 2) to review an item purchased or otherwise consumed by the user. In some embodiments, the electronic commerce application 215 verifies that a user has purchased or consumed an item that the user is reviewing.

As the electronic commerce application 215 may have a substantial amount of customer review data 265 (FIG. 2), the reviews management application 218 can leverage the customer review data 265 to improve search accuracy and relevancy. For example, the reviews management application 218 may surface keywords or phrases of customer reviews for use in a search component 100 (FIGS. 1A-1B) of the electronic commerce application 215, such as a search engine, a search engine auto-complete component 115 (FIGS. 1A-1B), or a search results refinement component.

In 506, for a given browse node 266, search queries 106 (FIGS. 1A-1B) that resulted in a selection of the browse node 266 may be identified. For example, a browse node 266 for "Headphones" may be used to determine search queries 106 that resulted in the user navigating to the "Headphones" browse node 266 during an electronic commerce session. The user may have, for example, performed a search query 106 of "headphones that are comfortable" to arrive at the "Headphones" browse node 266.

Next, in 509, a phrase in the search queries 106 identified in 506 may be detected. Referring to the example above, the phrase "headphones that are comfortable" may be identified from the example search query 106. Other example phrases that may be identified in search queries 106 may include "headphones that are good for children," "headphones that have good sound quality," and "headphones that are comfortable."

In 512, a semantic structure of the phrases may be determined. In some embodiments, phrase chunking may be applied to identify the semantic structure, which is a natural language process that separates and segments a phrase into sub-constituents, such as a noun, a verb, an adverb, a preposition, prepositional phrases, etc. In the example of FIG. 3, the phrase "headsets with good reception" can be described as having a semantic structure of noun-preposition-adjective-noun.

For each of the detected phrases, in 515, the semantic structure may be used to determine a sentiment metric and/or a subjectivity metric. A sentiment metric may comprise, for example, a numeric value that describes a customer sentiment of the phrase, whether positive, negative, or neutral. In various embodiments, a predefined list of keywords may be compared to adjectives identified in a phrase to determine whether customer sentiment is positive, negative, or neutral. In one example, the phrase "headsets with good reception" may be parsed to identify that "good" is an adjective used traditionally in positive reviews and that "good" is being used to describe "reception." A sentiment metric may be generated indicative of a positive customer sentiment. In another example, the phrase "headsets with bad reception" may be parsed to identify that "bad" is an adjective used generally in negative reviews and that "bad" is being used to describe "reception." In this example, a sentiment metric may be generated indicative of a negative customer sentiment. In various embodiments, the sentiment metric may be a metric having a numeric value between −1 and 1, where values in the range of −1 to 0 are indicative of a negative sentiment and values in the range of 0 to 1 are indicative of a positive sentiment.

A subjectivity metric may comprise a numeric value that describes whether a word or phrase is subjective (as opposed to objective). In one example, a predefined list of terms may be compared to a word or series of words in a phrase to determine whether a phrase is subjective. In one example, the phrase "headphones that are comfortable" may be analyzed to determine that comfort is a subjective quality or an opinion of the user, potentially varying from other opinions. In various embodiments, the subjectivity metric may be a metric having a numeric value between −1 and 1, where values in the range of −1 to 0 are indicative of a phrase being objective and values in the range of 0 to 1 are indicative of a phrase being subjective.

As a sentiment metric may have been generated, in 518, a determination may be made whether a phrase has a positive sentiment based at least in part on the sentiment metric. If the sentiment metric is indicative of a negative sentiment, the process may proceed to 521 where the phrase is removed from further analysis. The process may terminate thereafter. Alternatively, if the sentiment metric is indicative of a positive sentiment, the process may proceed to 524. In 524, a determination may be made whether a phrase is subjective based at least in part on the subjectivity metric determined in 515. If the subjectivity metric is indicative of an objective phrase, the process may revert to 521 where the phrase is removed from future analysis. The process may terminate thereafter. Conversely, if the subjectivity metric is indicative of a subjective phrase, the process may proceed to 527.

In 527, a ranked list of subjective phrases having a positive sentiment may be generated for the browse node 266, for example, to determine whether to surface all or a portion of the phrases for the browse node 266. Surfacing may include, for example, being able to use the phrase to locate a browse node 266, or items in the browse node 266, using the particular phrase in a search component 100 of the electronic commerce application 215. In various embodiments, a polarity metric may be generated as a function of the sentiment metric and/or the subjectivity metric determined in 515. In one embodiment, the function may be described as:

$$P_{Metric} = \text{Average}(\alpha+\beta) \quad \text{(Eq. 2)},$$

where $P_{Metric}$ is the polarity metric, $\alpha$ is the sentiment metric, and $\beta$ is the subjectivity metric.

In some embodiments, the function may include a search count that is determined for the phrase describing a number of times the phrase resulted in search results having items within the browse node 266. As a non-limiting example, for the "Televisions" browse node 266, a number of times the search query 106 "television with good audio quality" was used to return search results having items in the "Televisions" browse node 266 may be determined. As may be appreciated, phrases used in search queries 106 more frequently may be ranked higher than those used less frequently.

Similarly, in some embodiments, the function may include a customer review count that is determined for the phrase describing a number of times the phrase was used in customer reviews for items associated with the browse node 266. For example, a number of times the phrase "television with good audio quality," is used in customer reviews for items in the "Televisions" browse node 266 may be determined. As may be appreciated, phrases used more frequently in customer reviews may be ranked higher than those used less frequently.

Using the ranked lists of phrases for the browse node 266, in 530, a determination may be made to identify phrases having a rank exceeding a predefined threshold. For example, the phrases in the top 30% may be associated with the browse node 266 to query items associated with the browse node 266. For the phrases that do not exceed the predefined threshold, the process proceeds to 533 where those phrases are not used. As may be appreciated, these phrases may be phrases with negative sentiment and/or low subjectivity.

Conversely, for the phrases having a rank exceeding a predefined threshold, those phrases may be associated with the browse node 266 in 536. This may include, for example, storing the phrases in the data store 212 in association with the browse node 266, storing the phrases in its own data store 212, or making the phrases accessible to an external service. In one embodiment, the external service comprises a service that utilizes the phrases to determine a relevancy of items in the item catalog 248. In other embodiments, the external service comprises a recommendation service that utilizes the phrases to recommend one or more items to a user. The phrases associated with the browse node 266 may be used to identify items appearing in the browse node 266 that are relevant to those phrases or have customer reviews that use the phrases, as will be discussed below with respect to FIG. 6. Further, in some embodiments, the flowchart of FIG. 5 may be used to generate a ranked list of subjective keywords, as opposed to a ranked list of subjective phrases.

Figure 6:
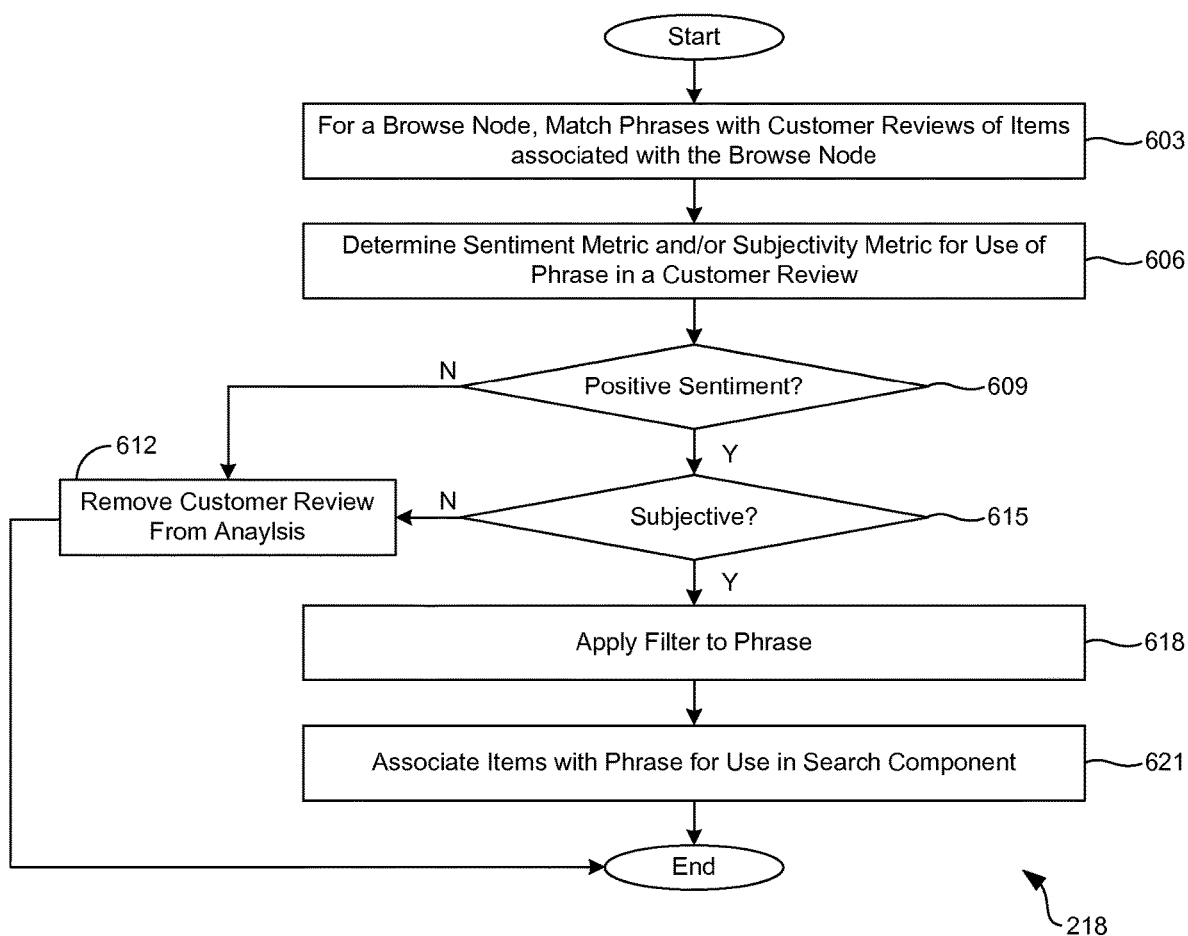
FIG. 6 is a flowchart illustrating another example of functionality implemented as portions of the reviews management application executed in a computing environment in the networked environment of FIG. 2 according to various embodiments of the present disclosure.

Referring next to FIG. 6, shown is a flowchart that provides one example of the operation of a portion of the reviews management application 218 according to various embodiments. It is understood that the flowchart of FIG. 6 provides merely an example of the many different types of functional arrangements that may be employed to implement the operation of the portion of the reviews management application 218 as described herein. As an alternative, the flowchart of FIG. 6 may be viewed as depicting an example of elements of a method implemented in the computing environment 203 (FIG. 2) according to one or more embodiments.

As discussed above with respect to FIG. 5, phrases having a positive sentiment and high subjectivity may be identified and associated with a browse node 266. In FIG. 6, the items associated with the browse node 266 having customer reviews that use one or more of those phrases may be identified. In 603, the phrases identified in search queries 106 (FIGS. 1A-1B0 having positive sentiment and high subjectivity may be used to match the phrases with customer reviews for items associated with a browse node 266. For example, assuming a phrase identified for a search query 106 includes "headphones with great audio quality," customer reviews may be analyzed to determine whether a similar or equivalent phrase is used. Analysis may include querying the data store using, for example, a SQL query, to identify occurrences of the phrases in customer review data 265.

In some embodiments, adjectives may be replaced with synonyms to create a set of similar phrases. For example, the phrase "headphones with great audio quality," can be used to identify similar phrases of "headphones with good audio quality," "headphones with excellent audio quality," "headphones with great auditory quality," "headphones with good acoustic quality," etc.

For the customer reviews found using a phrase or a similar phrase associated with the browse node 266, in 606, a sentiment metric and/or a subjectivity metric may be determined for a use of the phrase in its respective customer review. The semantic structure of a customer review may be used to determine the sentiment metric and/or the subjectivity metric. In various embodiments, a predefined list of keywords may be compared to adjectives identified in a phrase to determine whether customer sentiment for a customer review is positive, negative, or neutral.

In one example, the phrase "television with decent resolution" may be parsed to identify that "decent" is an adjective used traditionally in positive reviews and that "decent" is being used to describe "resolution." The sentiment metric may be generated indicative of a positive customer sentiment. In another example, the phrase "television with poor resolution" may be parsed to identify that "poor" is an adjective used generally in negative reviews and that "poor" is being used to describe "resolution." In this example, a sentiment metric may be generated indicative of a negative customer sentiment. In various embodiments, the sentiment metric may be a metric having a numeric value between −1 and 1, where values in the range of −1 to 0 are indicative of a negative sentiment and values in the range of 0 to 1 are indicative of a positive sentiment.

Similar to the sentiment metric, the subjectivity metric may comprise a numeric value that describes whether a word or phrase is subjective (as opposed to objective). In one example, the phrase "television good for use outdoors" may be analyzed to determine that "good for use outdoors" is a subjective statement or an opinion of the user, potentially varying from other statements or opinions. In various embodiments, the subjectivity metric may be a metric having a numeric value between −1 and 1, where values in the range of −1 to 0 are indicative of a phrase being objective and values in the range of 0 to 1 are indicative of a phrase being subjective.

As a sentiment metric may have been generated, in 609, a determination may be made whether a phrase has a positive sentiment based at least in part on the sentiment metric. If the sentiment metric is indicative of a negative sentiment, the process may proceed to 612 where the customer review is removed from further analysis. The process may terminate thereafter. Alternatively, if the sentiment metric is indicative of a positive sentiment, the process may proceed to 615. In 615, a determination may be made whether a phrase is subjective based at least in part on the subjectivity metric determined in 606. In some embodiments, the determinations of 609 and 615 may be made using a polarity metric generated as a function of the sentiment metric and/or the subjectivity metric determined in 606. In various embodiments, the function may be expressed as Eq. 1 or Eq. 2 above.

If the subjectivity metric is indicative of a non-subjective phrase or, in other words, an objective phrase, the process may revert to 612 where the customer review is removed from further analysis. The process may terminate thereafter. Conversely, if the subjectivity metric is indicative of a subjective phrase, the process may proceed to 618. In 618, a filter may be applied to the phrase to remove customer reviews having terms not useful in performing searches for items, vulgar terms, or other terms. In one embodiment, a predefined list of words or phrases may be compared to the customer reviews to remove customer reviews using equivalent or similar words or phrases as set forth in the predefined list.

As a result of 618, customer reviews that are relevant to search queries 106 performed to locate items are identified as having positive sentiment and/or high subjectivity. As may be appreciated, these customer reviews may be beneficial in increasing search accuracy and/or search relevancy. Accordingly, in 621, items associated with the customer reviews may be associated with those phrases for use in a search component 100 (FIGS. 1A-1B) of the electronic commerce application 215 that may include, for example, a search engine, a search engine auto-complete component 115 (FIGS. 1A-1B), or a search results refinement component.

As a non-limiting example, a customer review for the item "AlphaCo Television" may include the phrase "great for outdoor use." As the phrase "great for outdoor use" may be determined to have a positive sentiment and a high subjectivity, this phrase may be surfaced for use in a search engine of the electronic commerce application 215. For example, when a user performs a query for "television great for outdoor use," the "AlphaCo Television" may be shown in the search results. In addition, a browse node 266 having the "AlphaCo Television" may also be shown in the search results to facilitate refinement of the search.

Figure 7:
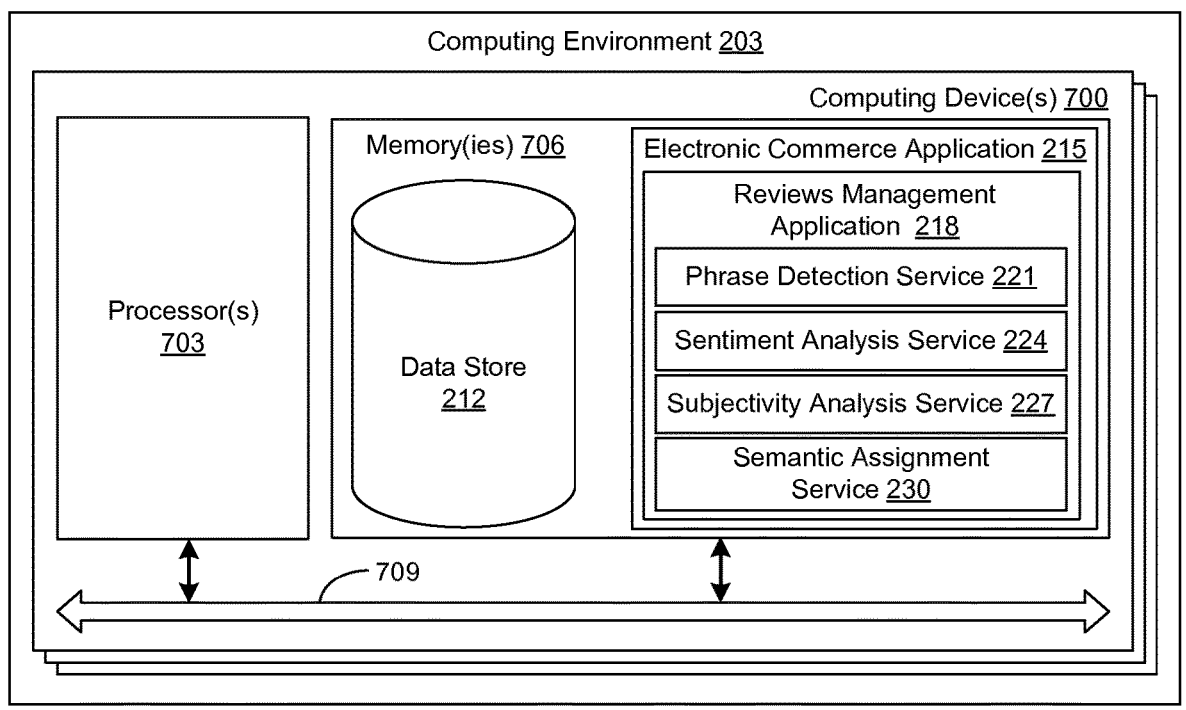
FIG. 7 is a schematic block diagram that provides one example illustration of a computing environment employed in the networked environment of FIG. 2 according to various embodiments of the present disclosure.

With reference to FIG. 7, shown is a schematic block diagram of the computing environment 203 according to an embodiment of the present disclosure. The computing environment 203 includes one or more computing devices 700. Each computing device 700 includes at least one processor circuit, for example, having a processor 703 and a memory 706, both of which are coupled to a local interface 709. To this end, each computing device 700 may comprise, for example, at least one server computer or like device. The local interface 709 may comprise, for example, a data bus with an accompanying address/control bus or other bus structure as can be appreciated.

Stored in the memory 706 are both data and several components that are executable by the processor 703. In particular, stored in the memory 706 and executable by the processor 703 are the electronic commerce application 215, the reviews management application 218, the phrase detection service 221, the sentiment analysis service 224, the subjectivity analysis service 227, the semantic assignment service 230, and potentially other applications. Also stored in the memory 706 may be a data store 212 and other data. In addition, an operating system may be stored in the memory 706 and executable by the processor 703.

It is understood that there may be other applications that are stored in the memory 706 and are executable by the processor 703 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 706 and are executable by the processor 703. In this respect, the term "executable" means a program file that is in a form that can ultimately be run by the processor 703. Examples of executable programs may be, for example, a compiled program that can be translated into machine code in a format that can be loaded into a random access portion of the memory 706 and run by the processor 703, source code that may be expressed in proper format such as object code that is capable of being loaded into a random access portion of the memory 706 and executed by the processor 703, or source code that may be interpreted by another executable program to generate instructions in a random access portion of the memory 706 to be executed by the processor 703, etc. An executable program may be stored in any portion or component of the memory 706 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 706 is defined herein as including both volatile and nonvolatile memory and data storage components. Volatile components are those that do not retain data values upon loss of power. Nonvolatile components are those that retain data upon a loss of power. Thus, the memory 706 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 703 may represent multiple processors 703 and/or multiple processor cores and the memory 706 may represent multiple memories 706 that operate in parallel processing circuits, respectively. In such a case, the local interface 709 may be an appropriate network that facilitates communication between any two of the multiple processors 703, between any processor 703 and any of the memories 706, or between any two of the memories 706, etc. The local interface 709 may comprise additional systems designed to coordinate this communication, including, for example, performing load balancing. The processor 703 may be of electrical or of some other available construction.

Although the electronic commerce application 215, the reviews management application 218, the phrase detection service 221, the sentiment analysis service 224, the subjectivity analysis service 227, the semantic assignment service 230, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 5 and 6 show the functionality and operation of an implementation of portions of the reviews management application 218. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 703 in a computer system or other system. The machine code may be converted from the source code, etc. If embodied in hardware, each block may represent a circuit or a number of interconnected circuits to implement the specified logical function(s).

Although the flowcharts of FIGS. 5 and 6 show a specific order of execution, it is understood that the order of execution may differ from that which is depicted. For example, the order of execution of two or more blocks may be scrambled relative to the order shown. Also, two or more blocks shown in succession in FIGS. 5 and 6 may be executed concurrently or with partial concurrence. Further, in some embodiments, one or more of the blocks shown in FIGS. 5 and 6 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the electronic commerce application 215, the reviews management application 218, the phrase detection service 221, the sentiment analysis service 224, the subjectivity analysis service 227, and the semantic assignment service 230, that comprises software or code can be embodied in any non-transitory computer-readable medium for use by or in connection with an instruction execution system such as, for example, a processor 703 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the electronic commerce application 215, the reviews management application 218, the phrase detection service 221, the sentiment analysis service 224, the subjectivity analysis service 227, and the semantic assignment service 230, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 700, or in multiple computing devices in the same computing environment 203. Additionally, it is understood that terms such as "application," "service," "system," "engine," "module," and so on may be interchangeable and are not intended to be limiting.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium for improving search accuracy and relevancy in a search engine by performing an analysis of customer reviews embodying program code executable in at least one computing device that, when executed by the at least one computing device, causes the at least one computing device to:
    identify a plurality of items categorized in a browse node of an item taxonomy;
    identify a plurality of performed search queries that resulted in a selection of the browse node during a past electronic commerce session performed in an electronic commerce application, wherein the selection of the browse node is identified from a record of a navigation path of at least one user account that navigated to the browse node;
    for individual ones of the plurality of items, analyze individual ones of a plurality of customer reviews for a corresponding one of the plurality of items to identify a plurality of phrases made pertaining to the individual ones of the plurality of items in the plurality of customer reviews;
    rank the plurality of phrases based at least in part on a polarity metric generated for individual ones of the plurality of phrases, wherein the polarity metric is generated as a function of a subjectivity metric and a sentiment metric determined for a corresponding one of the plurality of phrases, the subjectivity metric specifying a measure of subjectivity or objectivity of the corresponding one of the plurality of phrases based at least in part on at least one term in the corresponding one of the plurality of phrases being compared to a predefined list of terms that indicates subjectivity or objectivity, wherein the subjectivity metric comprises a numeric value between a predetermined negative value and a predetermined positive value and a negative value indicates objectivity and a positive value indicates subjectivity or vice versa;
    associate at least a portion of the plurality of phrases having a rank exceeding a predefined threshold with the browse node, wherein the plurality of phrases having the rank exceeding the predefined threshold are identified as having a positive sentiment and a high degree of subjectivity determined based at least in part on the subjectivity metric and the sentiment metric; and
    in response to a portion of a search query being provided in a search field for one of the plurality of items categorized in the browse node, provide at least one of the plurality of phrases having the positive sentiment and the high degree of subjectivity in a search engine auto-complete component of the search field.

2. The non-transitory computer-readable medium of claim 1, further comprising at least one of providing the portion of the plurality of phrases in a search results refinement component of the electronic commerce application and surfacing the portion of the plurality of phrases in a dialog.

3. The non-transitory computer-readable medium of claim 1, wherein the polarity metric is further generated as a function of a number of occurrences of a respective one of the plurality of phrases in the plurality of search queries and a number of occurrences of a respective one of the plurality of phrases in the plurality of customer reviews.

4. A system for improving search accuracy and relevancy in a search engine by performing an analysis of customer reviews, comprising:
    at least one computing device comprising at least one hardware processor; and
    program instructions executable in the at least one computing device that, when executed, cause the at least one computing device to:
        identify a search query that resulted in a selection of a browse node of an item taxonomy during a past electronic commerce session performed in an electronic commerce application, wherein the selection of the browse node of the item taxonomy is identified from a record of a navigation path of at least one user account that navigated to the browse node of the item taxonomy;
        identify a plurality of items capable of access through a manipulation of the browse node in the item taxonomy;
        for individual ones of the plurality of items, analyze at least one customer review for a corresponding one of the plurality of items to identify at least one phrase used in the customer review that appears in the search query, the at least one phrase made pertaining to the individual ones of the plurality of items in the at least one customer review;
        determine that a ranking of the at least one phrase in a plurality of phrases exceeds a predetermined threshold based at least in part on a subjectivity metric that specifies a measure of subjectivity or objectivity of the at least one phrase based at least in part on a comparison of at least one term in the at least one phrase to a list of terms that indicates subjectivity or objectivity;
        rank the plurality of phrases based at least in part on a polarity metric generated for individual ones of the plurality of phrases, the polarity metric being generated based at least in part on the subjectivity metric and a customer sentiment metric determined for corresponding ones of the plurality of phrases, wherein the subjectivity metric comprises a numeric value between a predetermined negative value and a predetermined positive value, and a negative value indicating objectivity and a positive value indicating subjectivity, or vice versa; and
        in response to a portion of a search query being provided in a search field for one of the plurality of items categorized in the browse node, provide the at least one phrase in a search component based at least in part on the subjectivity metric determined for the at least one phrase.

5. The system of claim 4, wherein the plurality of phrases are used in a plurality of customer reviews.

6. The system of claim 5, wherein the subjectivity metric comprises a numeric value between negative one and positive one.

7. The system of claim 6, wherein:
    the search query is one of a plurality of search queries; and the polarity metric is generated based at least in part on a number of occurrences of a respective one of the plurality of phrases in the plurality of search queries.

8. The system of claim 6, wherein the polarity metric is generated based at least in part on a number of occurrences of a respective one of the plurality of phrases in the plurality of customer reviews.

9. The system of claim 6, further comprising program instructions that, when executed, cause the at least one computing device to make at least a portion of the plurality of phrases having a rank exceeding a predefined threshold available for use by the search component of the electronic commerce application.

10. The system of claim 4, wherein the search component is configured to search a plurality of items offered through the electronic commerce application, the search component being configured to use the at least one phrase in a suggestion for a subsequent search query, the search component comprising a search engine, a search engine auto-complete component, or a search results refinement component.

11. The system of claim 4, wherein further comprising program instructions that, when executed, cause the at least one computing device to filter the at least one phrase using a plurality of predefined semantics accessed from a data store.

12. The system of claim 4, wherein the at least one computing device is further directed to provide a portion of the plurality of phrases in a search results refinement component of an electronic commerce application and surface the portion of the plurality of phrases in a dialog.

13. A computer-implemented method for improving search accuracy and relevancy in a search engine by performing an analysis of customer reviews, comprising:
   identifying, by at least one computing device, a plurality of search queries that, through a subsequent manipulation of a network site made after the plurality of search queries were performed, resulted in a selection of a browse node of an item taxonomy, wherein the identifying that the subsequent manipulation of the network site resulted in the selection of the browse node of the item taxonomy comprises identifying a record of a navigation path of a user that includes the user navigating to the browse node of the item taxonomy;
   identifying, by the at least one computing device, a plurality of items categorized in the browse node in the item taxonomy;
   for individual ones of the plurality of items, analyzing, by the at least one computing device, a plurality of customer reviews for a corresponding one of the plurality of items to identify a plurality of phrases used in the plurality of customer reviews that appears in at least one of the plurality of search queries, the plurality of phrases made pertaining to the individual ones of the plurality of items in the plurality of customer reviews;
   determining a subjectivity metric that specifies subjectivity or objectivity based at least in part on a comparison of at least one term in a corresponding one of the plurality of phrases to a list of terms that indicates subjectivity or objectivity;
   ranking, by the at least one computing device, the plurality of phrases based at least in part on a polarity metric generated for individual ones of the plurality of phrases, the polarity metric being generated based at least in part on the subjectivity metric and a customer sentiment metric determined for corresponding ones of the plurality of phrases, wherein the subjectivity metric comprises a numeric value between a predetermined negative value and a predetermined positive value, where a negative value indicates objectivity and a positive value indicates subjectivity, or vice versa; and
   in response to a portion of a search query being provided in a search field for one of the plurality of items categorized in the browse node, providing, by the at least one computing device, at least one phrase of the plurality of phrases as a suggestion in a search component of a network site based at least in part on the ranking.

14. The computer-implemented method of claim 13, wherein the polarity metric is further generated as a function of:
   a number of occurrences of a respective one of the plurality of phrases in the plurality of search queries;
   a number of occurrences of a respective one of the plurality of phrases in the plurality of customer reviews; or
   a combination thereof.

15. The computer-implemented method of claim 14, wherein the customer sentiment metric is indicative of a positive consumer sentiment of a respective one of the plurality of phrases.

16. The computer-implemented method of claim 14, wherein the subjectivity metric is indicative of a high subjectivity of a respective one of the plurality of phrases.

17. The computer-implemented method of claim 13, wherein the network site further comprises an electronic commerce application.

18. The computer-implemented method of claim 13, wherein the network site further comprises the search component, wherein the search component configured to use the at least one phrase in a subsequent search query, the search component comprising a search engine, a search engine auto-complete component, or a search results refinement component.

19. The computer-implemented method of claim 13, wherein the browse node in the item taxonomy is selected during an electronic commerce session performed in an electronic commerce application.

20. The computer-implemented method of claim 13, further comprising:
   providing, by the at least one computing device, a portion of the plurality of phrases in a search results refinement component of an electronic commerce application; and
   surfacing, by the at least one computing device, the portion of the plurality of phrases in a dialog.

* * * * *